United States Patent [19]
Reba

[11] 4,186,860
[45] Feb. 5, 1980

[54] WEB THREADING SYSTEM
[75] Inventor: Imants Reba, Vancouver, Wash.
[73] Assignee: Crown Zellerbach Corporation, San Francisco, Calif.
[21] Appl. No.: 951,560
[22] Filed: Oct. 16, 1978
[51] Int. Cl.² .................. G03B 1/56; B65H 25/06
[52] U.S. Cl. ........................... 226/91; 226/7; 226/97
[58] Field of Search ............... 226/91, 5, 7, 97, 110; 34/156

[56] References Cited
U.S. PATENT DOCUMENTS

| | | | |
|---|---|---|---|
| 3,650,043 | 3/1972 | Overly | 34/156 |
| 3,705,676 | 12/1972 | Overly | 226/97 |
| 3,999,696 | 12/1976 | Reba | 226/91 X |
| 4,014,487 | 3/1977 | Reba | 226/91 |
| 4,136,808 | 1/1979 | Reba | 226/97 |

*Primary Examiner*—Edward J. McCarthy
*Attorney, Agent, or Firm*—Thomas R. Lampe

[57] ABSTRACT

A system for directing the tail of a web of flexible material to a predetermined location including a wall element having side edges and a web entry end and a web exit end and a Coanda nozzle located at the wall element web entry end to direct a gaseous flow therealong toward the web exit end. Venting means in the form of opposed foil elements extend from the Coanda nozzle toward the wall element side edges for laterally venting portions of the gaseous flow past the side edges to exert lateral forces on the web and spread it as the web is propelled along the wall element.

10 Claims, 4 Drawing Figures

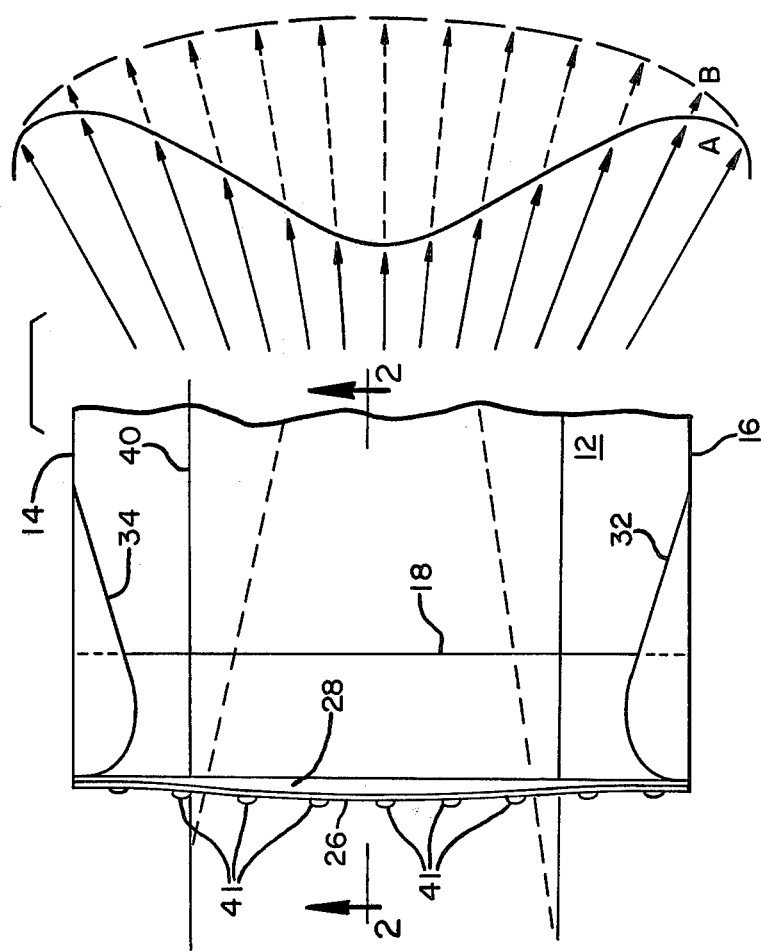
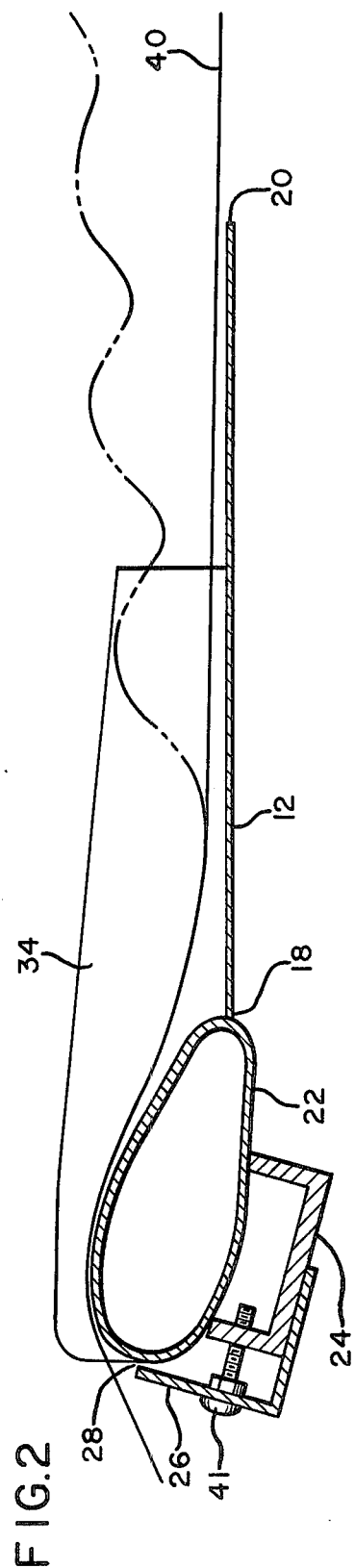
FIG.1
FIG.2

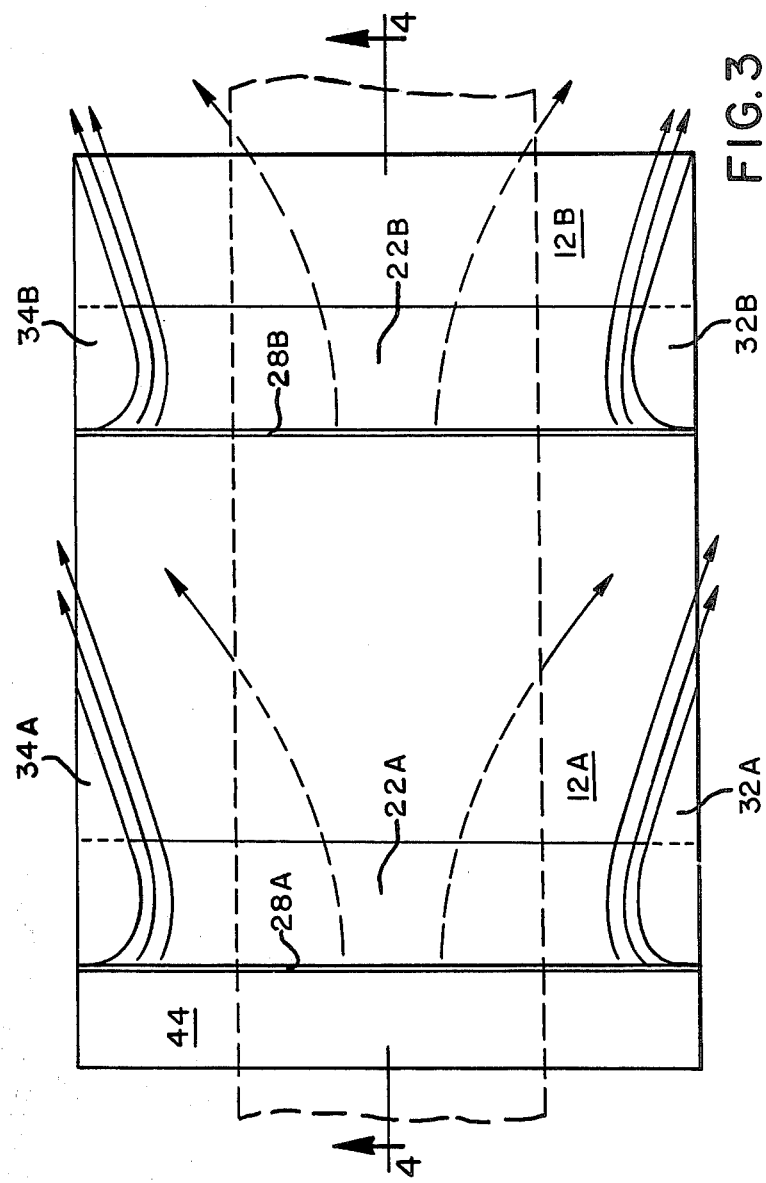
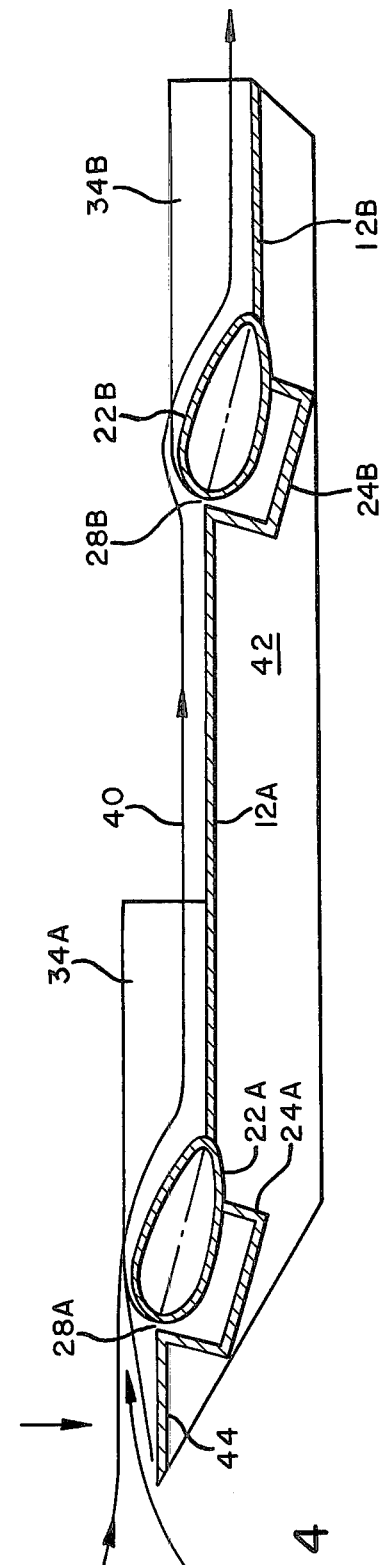
FIG. 3
FIG. 4

WEB THREADING SYSTEM

BACKGROUND OF THE INVENTION

U.S. Pat. Nos. 3,999,696 and 4,014,487 disclose systems for directing the end or tail of a moving web to a predetermined location such as into threading engagement with rolls forming a nip or the like. In the aforesaid systems, a gas such as air is directed through a restricted opening under pressure whereupon it attaches itself to a flow attachment surface due to the "Coanda effect", is directed to the predetermined location, and entrains ambient air. The web is placed into the path of the moving gas and air entrained thereby. The gas is moving at a velocity greater than the velocity of the moving web and thus the web is straightened out and directed to the predetermined location.

The arrangements illustrated in the aforesaid patents are entirely adequate to handle the vast majority of threading situations. One exception has been with certain paper machine configurations used to produce tissue grades at high dry end speeds, e.g. in the order of 3700 feet per minute. Specific problems that have arisen in such an operating environment have included excessive vertical web oscillations at the web exit end of the threader system and excessive flooding at nip entry points by the entraining gases used to propel the web. As a consequence, tail transfer problems have been encountered on occasion when attempting to thread high speed tissue, particularly where the threader system must be installed in close proximity to rolls or other nip defining means where the web is to be projected.

It is therefore an object of the present invention to provide a threader system of relatively inexpensive and simple construction which is adapted to provide stabilizing forces to the web being threaded and to vent a portion of the gaseous flow being used to propel the web prior to web exit from the system so that threading will not be interfered with by excessive air flow interference.

SUMMARY

The present invention includes a wall element having side edges and a web entry end and a web exit end. A Coanda nozzle is located at the wall element web entry end to direct the gaseous flow therealong toward the web exit end. Venting means is disposed in operative association with the wall element and extends from the Coanda nozzle to a location between the web entry and web exit ends for laterally venting portions of the gaseous flow past opposed side edges of the wall element. Lateral forces will be exerted upon the web by the gaseous flow portions to spread and stabilize the web as the web is propelled forward by the remainder of the gaseous flow. The venting means is in the form of foil elements disposed in opposition to one another along the sides of the wall element. The foil elements each have fluid flow attachment surfaces leading from the Coanda nozzle to opposed side edges of the wall element.

BRIEF DESCRIPTION OF THE DRAWINGS

The preferred embodiments of the present invention are illustrated in the accompanying drawings in which:

FIG. 1 is a schematic plan view illustrating one embodiment of the present invention and including a schematic presentation of the velocity profile associated therewith;

FIG. 2 is a cross-sectional view taken along line 2—2 of FIG. 1;

FIG. 3 is a schematic plan view of another form of apparatus constructed in accordance with the teachings of the present invention; and FIG. 4 is a cross-sectional view taken along line 4—4 in FIG. 3.

GENERAL DESCRIPTION

Referring now to FIGS. 1 and 2, the embodiment illustrated includes a flat wall element 12 having side edges 14 and 16, a web entry end 18 and a web exit end 20. A Coanda nozzle is located at the web entry end and comprises a Coanda foil 22 and a bracket member 24 attached thereto which includes an upstanding leg 26 which cooperates with Coanda foil 22 to define an elongated slit 28 extending the full length of the Coanda nozzle.

The Coanda nozzle is of a two-dimensional type such as that illustrated in U.S. Pat. Nos. 3,999,696 and 4,014,487 and the operation thereof will not be described in detail other than to state that a gas such as air is forced under pressure upwardly through slit 28. Due to the Coanda effect the pressurized gas attaches itself to the curved outer surface of Coanda foil 22 and flows therealong toward the right as viewed in FIGS. 1 and 2. The pressurized entraining gas and ambient air entrained thereby will then flow along the upper surface of wall element 12 in a manner again described in the aforesaid two patents.

Venting means in the form of foil elements 32 and 34 are disposed in opposition to one another along the sides of wall element 12. The foil elements 32 and 34 extend from slit 28 to a location between the web entry and web exit ends of the wall element. Due to the Coanda effect portions of the gaseous flow passing over Coanda foil 22 will attach to foil elements 32 and 34 and flow along the fluid flow attachment surfaces thereof to opposed side edges of the wall element. The slit 28 extends between the side edges of the wall element and is disposed immediately adjacent to the foil element 32 and 34 to facilitate attachment of the gaseous flow portion thereto.

The operation of the apparatus according to FIGS. 1 and 2 will now be described. When it is desired to use the apparatus to direct the web of flexible material such as tissue to a predetermined location, pressurized gas is forced through slit 28 in a manner previously described so that it attaches to the Coanda foil 22. Assuming for the moment that the apparatus of FIGS. 1 and 2 does not utilize venting means in the form of foil elements 32 and 34, light weight material such as tissue when introduced into the gaseous flow established by the Coanda nozzle will have a tendency to bunch up and migrate toward the center of the wall element 12 as illustrated in phantom in FIG. 1. A second undesirable result is that such light weight material when exiting from the web exit end of the wall element will have a tendency to flutter or oscillate vertically as shown in phantom in FIG. 2, due not only to its bunched up condition but also due to a possibly excessive amount of entraining gases exiting therewith. Use of the venting means of the present invention minimizes this undesirable web movement and in addition greatly reduces the possibility of excessive gaseous flow flooding a nip or otherwise interfering with the proper operation of the threading system. In the arrangement of FIGS. 1 and 2 a portion of the gaseous flow passing over wall element 12 will attach to each of the foil elements 32 and 34 due to the Coanda effect and be laterally vented from the device by passing beyond the side edges of the wall element due to the fact that no side walls are attached to the wall element. This flow pattern will cause lateral forces to be exerted upon the web to spread and stabilize it as it is propelled forward by the remainder of the gaseous flow. The condition of such a spread web 40 is shown in solid lines in FIG. 1. Due to these stabilizing forces and the venting of excess gaseous flow, the web 40 will tend to remain in a rather straight path as it exits from the wall element as shown in solid lines in FIG. 2.

The spreading action just described can be further accentuated by increasing the percentage of gaseous flow that is vented away from the system by foil elements 32 and 34. One simple approach for accomplishing this end is by widening the slit 28 as it extends from the center of the wall element 12 to the side edges thereof. For example, a good spreading of tissue paper grade was obtained by utilizing a 0.002" slit opening at the center and 0.005" at the edges. Adjustment screws 41 extending between the upwardly extending legs of the bracket member 24 may be employed to adjust slit width. The velocity profile resulting from such a non-uniform slit is illustrated in FIG. 1 and designated by reference letter A. This should be compared with the velocity profile resulting from a uniform width slit and designated by reference letter B.

An alternative form of the invention is shown in FIGS. 3 and 4. The embodiment includes a wall element 12A and a Coanda foil at the web entry end thereof comprised of a Coanda foil 22A and a bracket member 24A forming a slit 28A therewith. Foil elements 32A and 34A are disposed in opposition to one another along the side edges of the wall element 12A leading from the slit 28A to the side edges of the wall element as previously described with reference to the embodiment in FIGS. 1 and 2. Disposed immediately adjacent to the web exit end of wall element 12A is a second Coanda nozzle comprised of Coanda foil 22B and a bracket member 24B defining a slit 28B therewith. A pair of foil elements 32B and 34B are disposed in opposition with respect to one another immediately adjacent to and downstream from slit 28B. The foil elements 32B and 34B extend along the edges of a wall element 12B which leads from Coanda foil 22B. It should be noted that wall element 12B is "stepped" downwardly from wall element 12A so that it lies in a different plane. All of the previously described elements are retained in fixed position relative to one another by being attached to a pair of side walls, one of which, side wall 42, is shown in FIG. 4.

The embodiment of FIGS. 3 and 4 includes a flat guide platform 44 upstream from the nozzle comprised of bracket member 24A and Coanda foil 22A. The guide platform 44 extends between side wall 42 and its companion side wall so that it extends the full width of the apparatus. The guide platform 44 improves lateral and horizontal web stability. The stabilizing effect is illustrated schematically in FIG. 4. The guide platform directs the entrained flow beneath and parallel to the path of web 40. The fast moving flow creates low pressure between the platform and the web, hence a normal stabilizing force is produced as shown by the arrow. Experiments have shown that a guide platform length from 0.5" to 2" is sufficient to generate a pronounced stabilizing effect. It should be appreciated that a web guide platform may also be used in a single nozzle apparatus of the type illustrated in FIGS. 1 and 2.

The embodiment of FIGS. 3 and 4 operates as follows. The Coanda nozzles are pressurized so that entraining fluid passes upwardly through slits 28A and 28B to create a continuous flow along the wall elements associated therewith. When a web is placed in engagement with the flow induced along Coanda foil 22A it is projected along wall element 12A. Portions of the gaseous flow are vented from the apparatus by foil elements 32A and 34A in a manner previously described with reference to the first embodiment. When the web reaches slit 28B it is again entrained by the air passing over Coanda foil 22B and along wall element 12B Foil elements 32B and 34B exert a second opposed lateral force on the web to spread and further stabilize it. It has been found that the multiple Coanda nozzle and venting arrangement as illustrated in FIGS. 3 and 4 result in a strong vertical tail stabilizing effect. The "stepped" pattern serves particularly well in long, steeply inclined draws.

I claim:

1. Apparatus for directing a web of flexible material to a predetermined location comprising:
   a wall element having side edges and a web entry end and a web exit end;
   a Coanda nozzle located at the wall element web entry end to direct a gaseous flow therealong toward said web exit end;
   venting means in operative association with said wall element and extending from said Coanda nozzle to a location between the web entry and web exit ends of said wall element for laterally venting portions of said gaseous flow past opposed side edges of the wall element whereby a web will have lateral forces exerted thereupon by said gaseous flow portions to spread and stabilize said web as the web is propelled forward by the remainder of said gaseous flow.

2. The apparatus of claim 1 wherein said venting means comprises foil elements disposed in opposition to one another along the sides of said wall element.

3. The apparatus of claim 2 wherein the foil elements each have fluid flow attachment surfaces leading from said Coanda nozzle to opposed side edges of said wall element.

4. The apparatus of claim 2 wherein said Coanda nozzle includes a Coanda foil and means cooperating with said Coanda foil to define a slit through which entraining gases exit to create gaseous flow along said wall element, said slit extending between the side edges of the wall element immediately adjacent to said foil elements.

5. The apparatus of claim 4 wherein the width of said slit is greater at the ends thereof than at the center thereof.

6. The apparatus according to claim 1 additionally comprising a second Coanda nozzle disposed adjacent to said wall element exit end, a second wall element operatively associated with said second Coanda nozzle for receiving a gaseous flow induced by said second Coanda nozzle and second venting means in operative association with said second wall element for again exerting lateral forces on said web.

7. The apparatus according to claim 1 additionally comprising a web guide platform positioned adjacent to the Coanda nozzle on the side of the nozzle remote from the wall element.

8. A method of directing a web of flexible material to a predetermined location comprising:
- flowing a pressurized gas through an elongated fluid flow exit defined by a Coanda nozzle so that a gaseous flow is induced thereby along a predetermined path defined by a wall element adjacent to said nozzle;
- operatively engaging said web and the gaseous flow induced by said Coanda nozzle;
- propelling said web along said wall element by entraining said web with said gaseous flow;
- venting portions of said gaseous flow in opposed lateral directions during the step of propelling said web; and
- spreading and stabilizing said web during propulsion thereof by entraining the edges of said web with said gaseous flow portions.

9. The method according to claim 8 wherein said portions of gaseous flow are vented by attaching same to foil elements disposed along the sides of said wall element.

10. The method according to claim 8 including the step of exerting a normal force on the web at a location upstream from said Coanda nozzle.

* * * * *